United States Patent [19]

Stanley

[11] Patent Number: 5,986,221
[45] Date of Patent: Nov. 16, 1999

[54] MEMBRANE SEAT WEIGHT SENSOR

[75] Inventor: James G. Stanley, Novi, Mich.

[73] Assignee: Automotive Systems Laboratory, Inc., Farmington Hills, Mich.

[21] Appl. No.: 08/993,678

[22] Filed: Dec. 18, 1997

Related U.S. Application Data

[60] Provisional application No. 60/032,385, Dec. 19, 1996.

[51] Int. Cl.⁶ .......................... G01G 19/08; G01G 19/52; G01G 3/14; H01H 3/02
[52] U.S. Cl. .................... 177/136; 177/144; 177/210 R; 280/735; 200/85 R; 200/85 A; 200/512
[58] Field of Search ................................ 280/735, 728.1, 280/731, 728.3; 200/512, 85 A, 85 R; 177/136, 144, 210 R

[56] References Cited

U.S. PATENT DOCUMENTS

| | | | |
|---|---|---|---|
| 3,617,660 | 11/1971 | Krakinowski | 200/512 |
| 3,668,337 | 6/1972 | Sinclair | 200/512 |
| 3,670,119 | 6/1972 | Gebhardt et al. | 200/52 |
| 3,672,699 | 6/1972 | De Windt | 280/150 |
| 3,718,791 | 2/1973 | Szablowski | 200/85 A |
| 4,137,116 | 1/1979 | Miller | 200/85 A |
| 4,864,084 | 9/1989 | Cardinale | 200/5 A |
| 4,987,898 | 1/1991 | Sones | 128/645 |
| 5,074,583 | 12/1991 | Fujita et al. | 280/735 |
| 5,161,820 | 11/1992 | Vollmer | 280/730 |
| 5,232,243 | 8/1993 | Blackburn et al. | 280/732 |
| 5,474,327 | 12/1995 | Schousek | 280/735 |
| 5,494,311 | 2/1996 | Blackburn et al. | 280/735 |
| 5,573,269 | 11/1996 | Gentry et al. | 280/735 |
| 5,624,132 | 4/1997 | Blackburn et al. | 280/735 |
| 5,695,859 | 12/1997 | Burgess | 200/512 |
| 5,878,620 | 3/1999 | Gilbert et al. | 280/735 |

*Primary Examiner*—Randy W. Gibson
*Attorney, Agent, or Firm*—Lyon, P.C.

[57] ABSTRACT

A membrane weight sensor incorporates a plurality of membrane switch elements, each characterized by a distinct activation force threshold determined by the effective diameter and activation travel distance of the associated membrane. A plurality of membrane switch elements is incorporated into a single membrane switch pad. The membrane switch pad is aligned with a pair of first and second plates, one of which incorporates a plurality of protrusions, each operatively coupled to a different membrane switch element for purposes of deflecting the associated membrane. The signals from each of the associated switch elements are encoded and combined so as to form a single analog output signal having a plurality of discrete levels indicative of the amount of force applied to the membrane weight sensor.

19 Claims, 4 Drawing Sheets

MEMBRANE SEAT WEIGHT SENSOR

CROSS-REFERENCE TO RELATED APPLICATIONS

The instant application claims the benefit of prior U.S. Provisional Application Ser. No. 60/032,385 filed Dec. 19, 1996.

TECHNICAL ART

The instant invention generally relates to sensors and systems for measuring weight and more particularly to a weight sensor for measuring the weight of occupants and other objects in a motor vehicle seat such as useful determining occupant seating conditions for controlling a vehcile safety restraint sytsem.

BACKGROUND OF THE INVENTION

A vehicle may contain automatic safety restraint actuators that are activated responsive to a vehicle crash for purposes of mitigating occupant injury. Examples of such restraint actuators include air bags, seat belt pretensioners, and deployable knee bolsters.

One objective of an automatic safety restraint system is to mitigate occupant injury, thereby not causing more injury with the automatic restraint system than would be caused by the crash had the automatic restraint system not been activated. Notwithstanding the protective benefit of these automatic safety restraint actuators, there is generally both a risk and a cost associated with the deployment thereof. Generally, it is desirable to only activate automatic safety restraint actuators when needed to mitigate injury because of the expense of replacing the associated components of the safety restraint system, and because of the potential for such activations to harm occupants. This is particularly true of air bag restraint systems, wherein occupants too close to the air bag at the time of deployment—i.e. out-of-position occupants—are vulnerable to injury or death from the deploying air bag even when the associated vehicle crash is relatively mild. Moreover, occupants who are of small stature or with weak constitution, such as children, small adults or people with frail bones are particularly vulnerable to injury induced by the air bag inflator. Furthermore, infants properly secured in a normally positioned rear facing infant seat (RFIS) in proximity to a front seat passenger-side air bag are also vulnerable to injury or death from the deploying air bag because of the close proximity of the infant seat's rear surface to the air bag inflator module.

Air bag inflators are designed with a given restraint capacity, as for example, the capacity to protect an unbelted normally seated fiftieth percentile occupant when subjected to a 30 MPH barrier equivalent crash, which results in associated energy and power levels which can be injurious to out-of-position occupants. While relatively infrequent, cases of injury or death caused by air bag inflators in crashes for which the occupants would have otherwise survived relatively unharmed have provided the impetus to reduce or eliminate the potential for air bag inflators to injure the occupants which they are intended to protect.

One technique for mitigating injury to occupants by the air bag inflator is to reduce the power and energy levels of the associated air bag inflator, for example by reducing the amount of gas generant in the air bag inflator, or the inflation rate thereof. This reduces the risk of harm to occupants by the air bag inflator while simultaneously reducing the restraint capacity of the air bag inflator, which places occupants a greater risk for injury when exposed to higher severity crashes.

Another technique for mitigating injury to occupants by the air bag inflator is to control the rate of inflation rate or the capacity of the inflator responsive to a measure of the severity of the crash. However, the risk of injury to such occupants would not be mitigated under the conditions of higher crash severity when the inflator is intentionally made aggressive in order to provide sufficient restraint for normally positioned occupants.

Yet another technique for mitigating injury to occupants by the air bag inflator is to control the activation of the air bag inflator responsive to the presence, position, and size of the occupant, or to the severity of the crash. For example, the air bag inflator can be disabled if the occupant weight is below a given threshold. Moreover, the inflation capacity can be adjusted by controlling the number of inflation stages of a multi-stage inflator that are activated. Furthermore, the inflation power can be adjusted by controlling the time delay between the firings of respective stages of a multi-stage inflator.

One measure of restraint capacity of an air bag inflator is the amount of occupant kinetic energy that can be absorbed by the associated air bag system, whereby when the occupant collides with the gas filled air bag, the kinetic energy of the occupant is converted to potential energy via the pressurization of the air bag, and this potential energy is dissipated by venting pressurized gases from the air bag. As a vehicle in a crash is decelerated, the velocity of an unrestrained occupant relative to the vehicle increases. Preferably, the occupant restraint process is commenced early in the crash event so as to limit the amount of occupant kinetic energy that must be absorbed and thereby minimize the associated restraint forces and accelerations of and loads within the occupant. If the occupant were a simple inertial mass without friction relative to the vehicle, the kinetic energy of the occupant would be given by $½ M·V^2$, where M is the mass of the occupant and V is the occupant velocity relative to the vehicle. If a real occupant were represented by an interconnected set of bodies, some of which have friction relative to the vehicle, each body of which may have differing velocities relative the vehicle, the above equation would apply to the motion of the center of gravity of the occupant. Regardless of the representation, occupants of larger mass will have a larger kinetic energy for the same velocity relative to the vehicle. Therefore, an occupant weight sensor is usefull in an air bag system with variable restraint capacity to enable the restraint capacity to be preferentially adapted to the weight, or mass, of the occupant.

Except for some cases of oblique or side-impact crashes, it is generally desirable to not activate an automatic safety restraint actuator if an associated occupant is not present because of the otherwise unnecessary costs and inconveniences associated with the replacement of a deployed air bag inflation system. Occupant presence can be detected by a seat weight sensor adapted to provide either a continuous measure of occupant weight or to provide a binary indication if the occupant weight is either above or below a specified weight threshold.

Known seat weight sensors comprise one or more pads employing force sensitive resistive (FSR) films. These arrangements are typically used as weight threshold systems to disable a passenger air bag when the seat is empty. Load cells attached to the seat mounting posts have also been used in research applications. Mechanisms that use string based potentiometers to measure downward seat displacement have also been investigated.

Such known arrangements suffer from several drawbacks. First, variable resistance force sensors have limited sensitivity and in some situations are not sensitive enough to put directly under a seat pad while still achieving the desired response. Second, the threshold weight system provides only very limited information. For example, such arrangements provide no indication as to the size of an occupant. Third, the resistance values of known variable force resistor change with temperature, and are subject to drift over time with a constant load on the sensor. Fourth, known arrangements comprise a plurality of resistors that are connected in parallel so that the overall signal can be dominated by a relatively light load which is concentrated upon any one of the resistors, thereby causing a measurement which erroneously indicates a larger weight than actually present on the seat. Fifth, these arrangements do not provide any information regarding the distribution of the weight on the seat.

Furthermore, other known sensing arrangements do not otherwise provide suitable results. For example, the use of load cells is prohibitively expensive for large-scale commercial applications. Strain gauges of any type may be impractical because of the difficulty in applying them to the strained material. Finally, mechanical string potentiometer based weight sensors are complex, and subject to failure from stretching of the string.

The prior art also teaches the use of seat weight sensors outside the automotive environment, for example as a means for disabling the activation of either a boat or an industrial machine if the operator is not properly seated, or for weighing a person seated on an exercise bike. These devices employ pneumatic bladders located in the seat, whereby the pressure within the bladder is used to either activate a threshold switch or to provide a continuous indication of occupant weight.

One problem with prior art pneumatic sensors, particularly when applied to the automotive environment, is their sensitivity to environmental conditions, particularly to ambient temperature and pressure. This requires the bladder to be partially filled with fluid under ambient conditions of lower temperature or higher pressure, thereby making the bladder more sensitive to bottoming out when exposed to localized or concentrated loads and therefor requiring a means for distributing the loads over the load bearing area of the bladder. Pneumatic seat weight sensors can be sensitive to the amount of air initially in the associated bladder. A seat weight sensor in an automotive environment must function reliably and accurately over a wide range of temperatures and pressures which can cause significant errors.

Another problem with a pneumatic seat weight sensor is that the overall height of the inflated sensor bladder must be sufficiently great to prevent the top and bottom surfaces of the bladder from compressing against one another responsive to a sufficiently great localized or concentrated load under conditions when the bladder has a relatively small amount of gas, such as would occur when the bladder is filled at low pressure or high temperature.

Yet another problem with a pneumatic seat weight sensor is that a gas filled bladder is also prone to loss of fluid by leakage or osmosis, which necessitates a means for automatically replenishing the working fluid of the bladder over the life of operation.

The prior art also teaches the use of hydraulic load cells, wherein the weight to be measured acts upon a piston element of known area, whereby the measured weight is found by multiplying a measured pressure times the known area. One problem with hydraulic load cells in the automotive environment, particularly in a seat, is that the effects of load cell orientation on hydraulic head can introduce load measurement errors.

SUMMARY OF THE INVENTION

The instant invention overcomes the above-noted problems by providing a membrane seat weight sensor incorporating a plurality of membrane switch elements, each characterized by a distinct activation force threshold determined by the effective diameter and activation travel distance of the associated membrane. The plurality of membrane switch elements is incorporated into a single membrane switch pad. The membrane switch pad is aligned with a pair of first and second plates which are substantially parallel to one another and which constitute the sensor housing. One of the plates incorporates a plurality of protrusions, each operatively coupled to a different membrane switch element for purposes of deflecting the associated membrane. The membrane switch elements each incorporate a first conductor attached to a diaphragm membrane that engages an associated protrusion attached to the first plate.

In a first embodiment, the membrane switch pad further incorporates a second conductor attached to a substrate and separated from the first conductor by a spacer within the membrane switch pad and having an aperture that characterizes the diaphragm. In operation, a compressive force applied to the first and second plates causes the protrusion to deflect the diaphragm, and if the magnitude of the force exceeds the activation threshold, the first and second conductors are compressed against one another closing the switch contact therebetween.

In a second embodiment, each switch element incorporates a pair of isolated and interleaved second and third conductors attached to a common substrate, both separated from the first conductor by a spacer within the membrane switch pad and having an aperture that characterizes the diaphragm. In operation, a compressive force applied to the first and second plates causes the protrusion to deflect the diaphragm, and if the magnitude of the force exceeds the activation threshold, the first conductor is compressed against the second and third conductors thereby closing the switch contact between the second and third conductors.

In a third embodiment, the second embodiment is modified by the inclusion of dielectric pads that are applied to the surface of the substrate to which the second and third conductors are attached, thereby increasing the associated activation force threshold.

The signals from each of the associated switch elements are encoded and combined so as to form a single analog output signal having a plurality of discrete levels indicative of the amount of force applied to the membrane seat weight sensor. In one embodiment, this common signal is formed from the parallel combination of the series combinations of each of the associated membrane switch signals and an associated series resistor, whereby the resistance of the associated series resistors is related to the associated activation force threshold.

The switching characteristic of the membrane seat weight sensor of the instant invention is relatively insensitive to temperature because governing electrical and physical properties of the materials constituting each associated membrane switch element are relatively insensitive to temperature. Furthermore, the response of the instant invention does not drift over time for a constant applied load.

The membrane seat weight sensor is incorporated into seat, below the seat cushion, and is sized so as to sense a substantial portion of the load applied to the seat. The instant invention senses load over the entire loading area of the seat, and produces an output signal which is relatively insensitive to the associated load distribution.

Accordingly, one object of the instant invention is to provide an improved seat weight sensor which provides a consistent and accurate measure of the seat loading independent of the location of the source of weight on the seat.

A further object of the instant invention is to provide an improved seat weight sensor which provides a consistent and accurate measure of the seat loading independent of the size and distribution of the source of weight on the seat.

A yet further object of the instant invention is to provide an improved seat weight sensor which provides a consistent and accurate measure of the seat loading independent of the amount of weight on the seat.

A yet further object of the instant invention is to provide an improved seat weight sensor which operates under a wide range of ambient temperature and pressure conditions.

A yet further object of the instant invention is to provide an improved seat weight sensor which can distinguish between a rear facing infant seat, for which an air bag system is preferably not deployed, and other occupants for which an air bag system is preferably deployed in the event of a crash of sufficient severity.

A yet further object of the instant invention is to provide an improved seat weight sensor which can be incorporated into an intelligent safety restraint system for which the preferable mode of the activation of a controllable occupant restraint system is dependent upon the weight of the occupant.

A yet further object of the instant invention is to provide an improved seat weight sensor which does not interfere with occupant comfort.

A yet further object of the instant invention is to provide an improved seat weight sensor which is insensitive to the orientation of the seat.

A yet further object of the instant invention is to provide an improved seat weight sensor which is inexpensive to produce.

In accordance with these objectives, one feature of the instant invention is a membrane seat weight sensor which incorporates a plurality of membrane switch elements each having a distinct activation force threshold.

Another feature of the instant invention is the incorporation of the plural membrane switch elements in a unitary membrane switch pad.

Yet another feature of the instant invention is the incorporation of a membrane switch encoder which converts the plural binary switch signals into a single output signal having discrete signal levels which are monotonically related to the magnitude of the applied load.

Yet another feature of the instant invention is the arrangement of membrane switch elements such that all of the conductors interfacing with the associated electrical switch elements are placed on a common substrate.

Yet another feature of the instant invention is the incorporation of small dielectric pads within the membrane switch so as to alter the activation force threshold of the associated membrane switch element.

The specific features of the instant invention provide a number of associated advantages. One advantage of the instant invention with respect to the prior art is that the instant invention is relatively insensitive to ambient temperature.

Another advantage of the instant invention is that the associated output signal does not drift over time for a constant applied load.

Yet another advantage of the instant invention is that the seat weight sensor thereof can enable a rear facing infant seat for which the air bag system is preferably not deployed to be distinguished from an occupant for which the air bag system is preferably deployed.

Yet another advantage of the instant invention is that the seat weight sensor thereof is sufficiently robust, reliable and accurate to enable associated occupant weight dependent control of a controllable occupant restraint system.

Yet another advantage of the instant invention is that the seat weight sensor thereof is relatively inexpensive to produce.

Accordingly, the instant invention provides an improved seat weight sensor which is relatively insensitive to the effects of ambient temperature and pressure; which is simple in construction and relatively robust and reliable in operation; which can be readily incorporated into an automotive seat without interfering with occupant comfort; and which can be produced relatively inexpensively.

The instant invention will be more fully understood after reading the following detailed description of the preferred embodiment with reference to the accompanying drawings. While this description will illustrate the application of the instant invention in an automotive safety restraint system, it will be understood by one with ordinary skill in the art that the instant invention can also be applied to other systems for weighing objects.

DETAILED DESCRIPTION OF THE PREFERRED EMBODIMENT(S)

Figure 1:
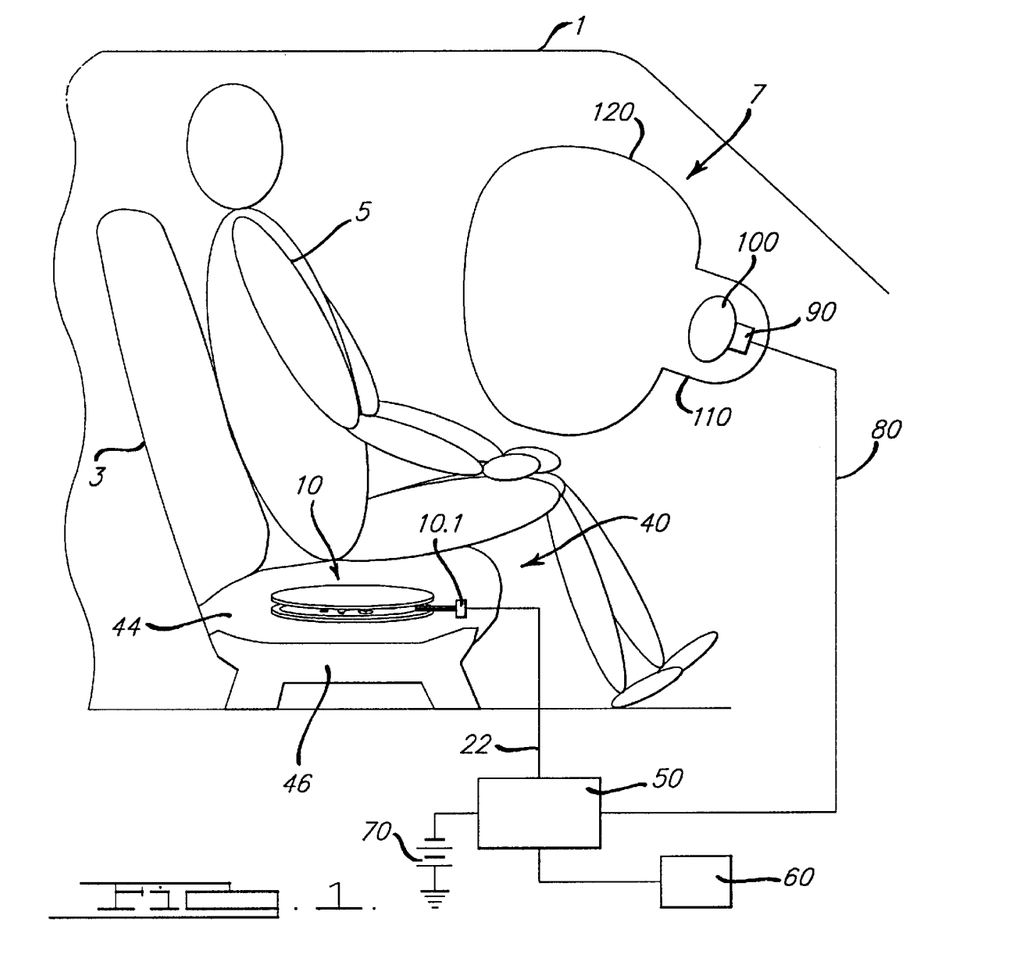
FIG. 1 illustrates the incorporation of the instant invention in a vehicle seat.
Figure 2A:
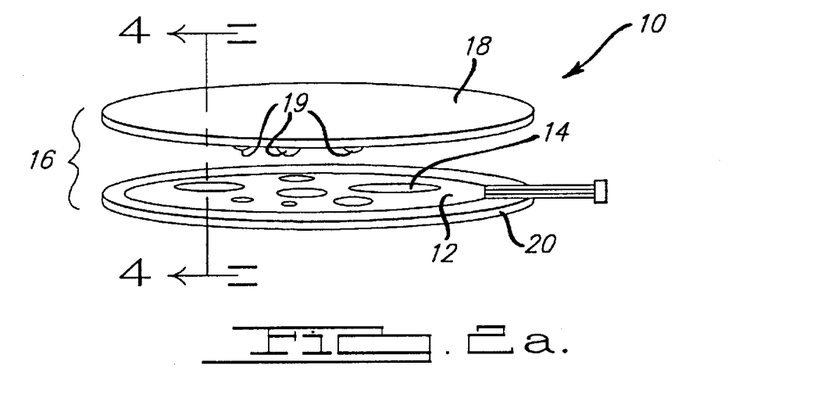
FIG. 2a illustrates an exploded view of an embodiment of a membrane seat weight sensor element in accordance with the instant invention.
Figure 2B:
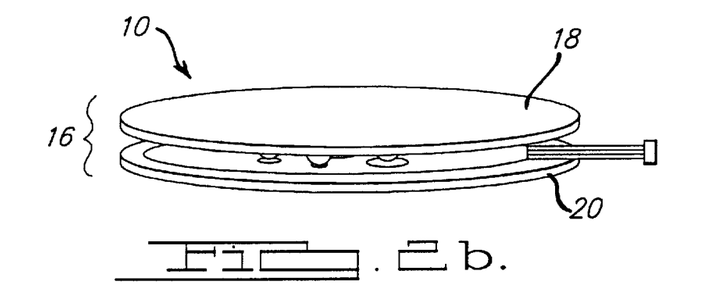
FIG. 2b illustrates a membrane seat weight sensor element in accordance with the instant invention.

Referring to FIG. 1, a seat 3 in a motor vehicle 1 incorporates a membrane seat weight sensor 10 mounted in the seat base 40 and sandwiched between the seat frame 46 below and the seat cushion foam 44 above. Referring to FIGS. 2a and 2b, the membrane seat weight sensor comprises a top plate 18, a plurality of protrusions 19 incorporated thereon, a base plate 20, and a plurality of membrane switch elements 14 incorporated in a membrane switch pad 12 disposed between a housing 16 further comprising the top 18 and base 20 plates, whereby each of the finger-like protrusions 19 is operatively coupled to an associated membrane switch element 14.

In operation, an occupant 5 seated on the base 40 of seat 3 compresses the top and base plates, thereby compressing each of the membrane switch elements 14 between the base plate 20 and the associated protrusion 19. If for a given membrane switch element 14 the applied load exceeds the associated activation force threshold, then the associated membrane switch element 14 is activated thereby closing the associated membrane switch, whereby the activation threshold for each of the membrane switch elements 14 is distinct. The plurality of membrane switch signals is encoded by and encoder 10.1 which converts the plural binary switch signals to a discrete analog signal which is monotonically related to the magnitude of the applied load. The sensor output signal is operably coupled to an electronic control module 50 which converts the weight signal output 22 to a measure of occupant weight using known analog, digital, or microprocessor circuitry and software. A crash sensor 60 is also operably coupled to the electronic control module 50. Responsive to a crash detected by the crash sensor 60, and further responsive to the sensed weight of the occupant as transformed from the weight signal output 22, the electronic control module 50 generates a signal 80 which is operably coupled to one or more initiators 90 of one or more gas generators 100 mounted in an air bag inflator module 110, thereby controlling the activation of the air bag inflator module assembly 7 so as to inflate the air bag 120 as necessary to protect the occupant 5 from injury which might otherwise be caused by the crash. The electrical power necessary to carry out these operations is provided by a source of power 70, preferably the vehicle battery.

Figure 3:
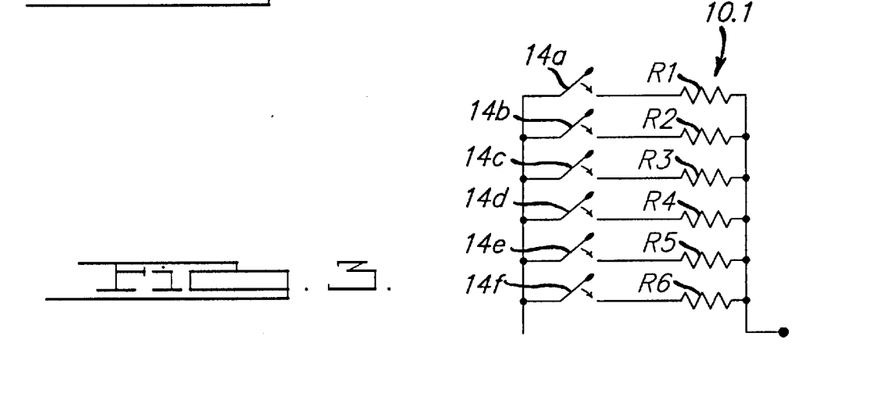
FIG. 3 illustrates a schematic diagram of one embodiment of the instant invention.

Referring to FIG. 3, a membrane switch encoder 10.1 provides converts the plural binary switch signals to a single sensor output having discrete signal levels which correspond to the associated discrete activation force thresholds associated with the different membrane switch elements 14. Each membrane switch element 14 is connected in series with an associated resistor, and these series resistor-switch combinations are connected in parallel. When the load applied to the membrane seat weight sensor 10 is less than the minimum activation force threshold, the composite output resistance is effectively infinite. When a small amount of weight closes the most sensitive membrane switch element 14a, the resistance across the sensor becomes R1. As the weight is increased, the next most sensitive membrane switch element 14b, will close making the resistance across the sensor equal to the resistance of R1 and R2 in parallel. The resistance and thus the output of the membrane seat weight sensor 10 makes quantum jumps as additional keys are closed. As the magnitude of the applied load is increased, additional membrane switch elements 14 become closed. The weight of a large adult will preferably close all of the membrane switch elements 14.

Figure 4A:
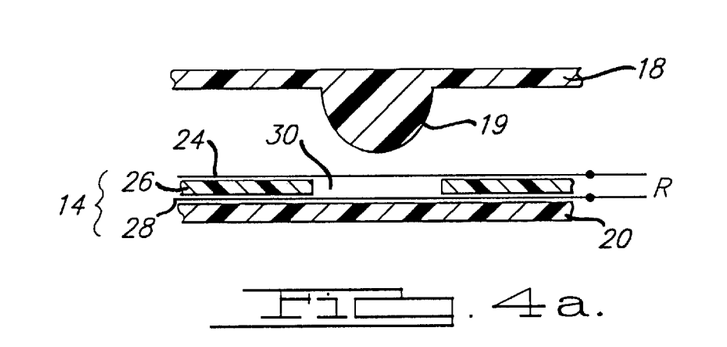
FIG. 4a illustrates a cross section view of a membrane switch incorporated in a first embodiment of a membrane seat weight sensor element, in an unloaded condition.

Referring to FIG. 4a, the membrane switch pad 12 comprises top 24 and bottom 28 substrates with a spacer 26 interposed therebetween. A protrusion 19 is operatively coupled to the top substrate 26 at the outside surface thereof proximate an associated aperture in the spacer 26, and at least a portion of the inside surface thereof is conductive. The top substrate is constructed from a polymer which is semi-flexible and which does not take a set at high temperature, such as Mylar™, Kynar™, Kapton™, or Ultem™.

Figure 4B:
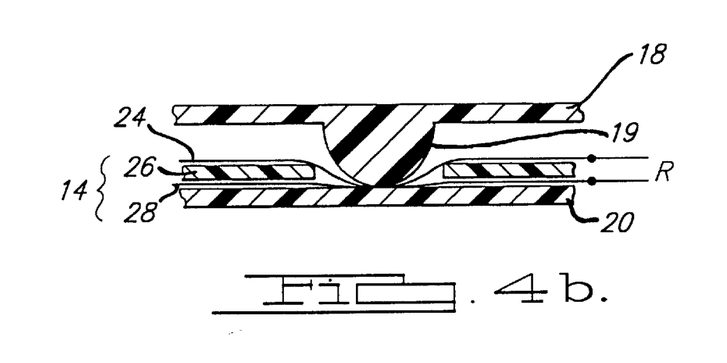
FIG. 4b illustrates a cross section view of a membrane switch incorporated in a first embodiment of a membrane seat weight sensor element, in a loaded condition.

In one embodiment, at least a portion of the inside surface of the bottom substrate 28 is conductive. Referring to FIG. 4b, if the force applied to the protrusion 19 exceeds the associated activation force threshold, the top substrate 24 is deflected so as to cause the conductive portions of the top 24 and bottom 28 substrates to contact one another, closing the associated membrane switch element 14.

Figure 5A:
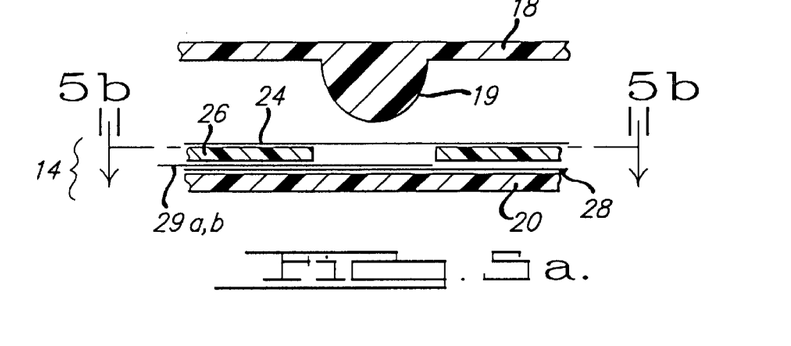
FIG. 5a illustrates a cross section view of a membrane switch incorporated in a second embodiment of a membrane seat weight sensor element, in an unloaded condition.
Figure 5B:
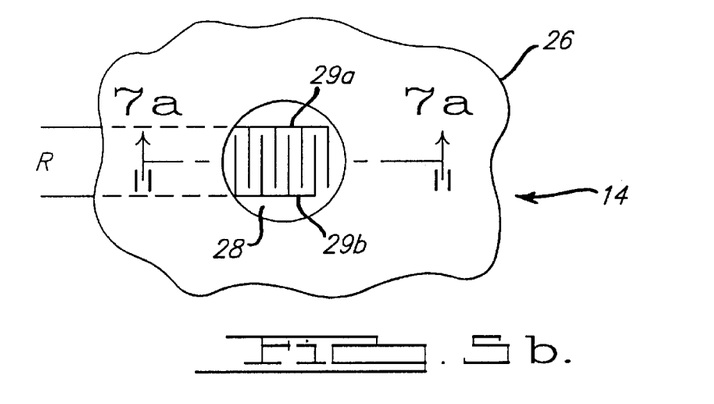
FIG. 5b illustrates a plan view of a second embodiment of a membrane switch incorporated in a second embodiment of a membrane seat weight sensor element.
Figure 6:
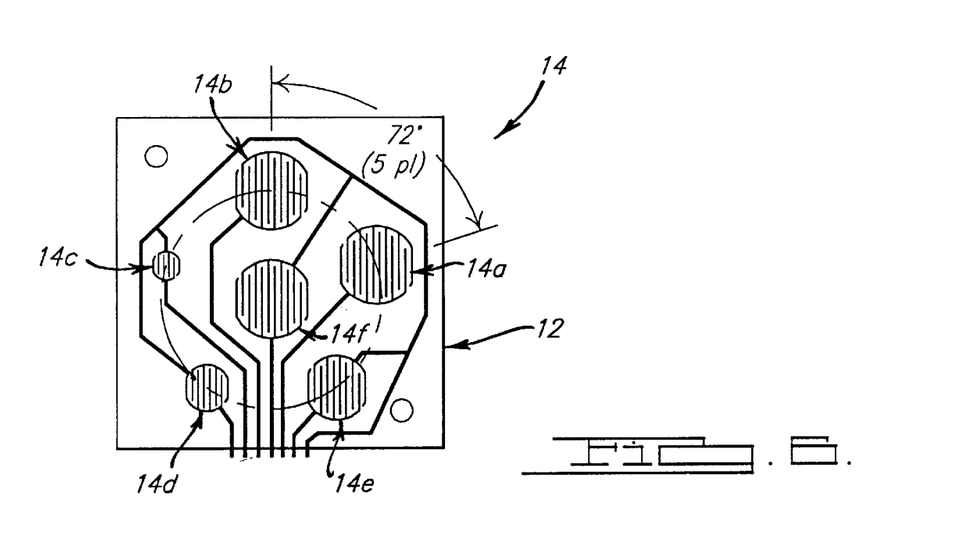
FIG. 6 illustrates a plan view of a membrane sensor pad in accordance with the instant invention.
Figure 7A:
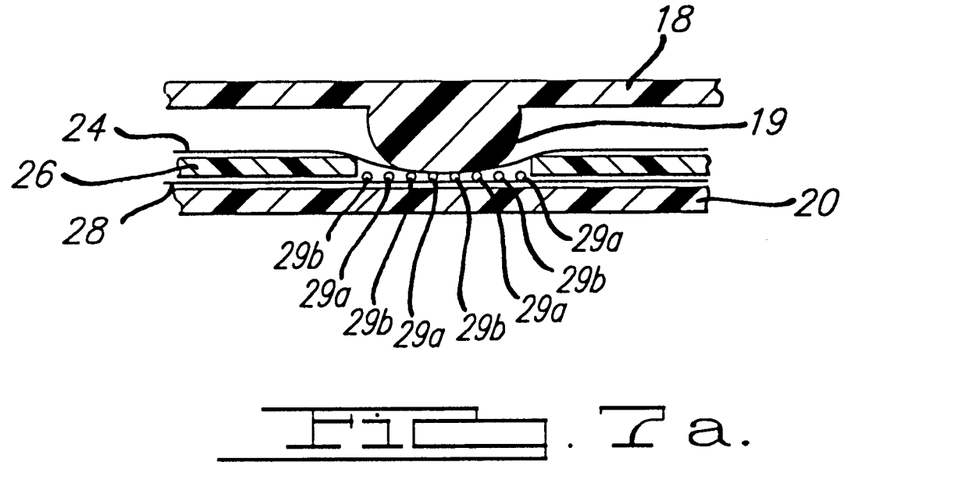
FIG. 7a illustrates a cross section view of a membrane switch incorporated in a second embodiment of a membrane seat weight sensor element, in a loaded condition.

Referring to FIGS. 5a and 5b, in another embodiment, the inside surface of the bottom substrate 28 is conductive along two distinct, electrically isolated conductive paths 29a,b that are proximate one another and proximate to the associated aperture 30 in the spacer 26. Referring to FIG. 7a, if the force applied to the protrusion 19 exceeds the associated activation force threshold, the top substrate 24 is deflected so as to cause the conductive portions of the top substrate 24 to contact the conductive paths 29a,b, causing the conductive paths 29a and 29b to become electrically shorted, closing the associated membrane switch element 14. FIG. 6 illustrates one embodiment of a membrane switch pad 14 in accordance with FIGS. 5a,b and 7a.

Figure 7B:
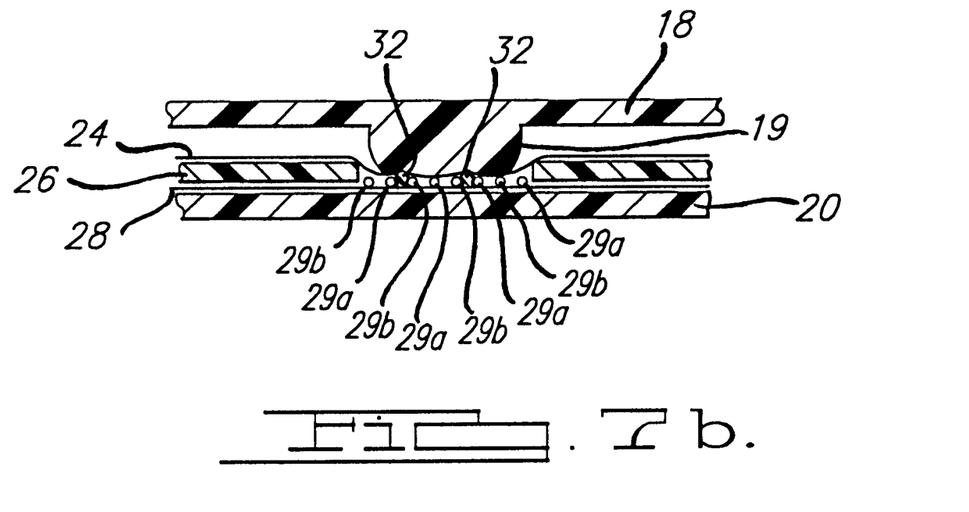
FIG. 7b illustrates a cross section view of a membrane switch incorporated in a third embodiment of a membrane seat weight sensor element, in a loaded condition.

The force threshold required to close the individual keys is dependent upon the diameter and thickness of aperture 30 in spacer 26, upon the geometry of the associated protrusion 19, and upon the mechanical properties of the top substrate 24 and the spacer 26. Generally, the activation force threshold is increased by decreasing the diameter of the aperture 30 or increasing the thickness of the spacer 26. Referring to FIG. 7b, the activation force threshold of a given membrane switch element 14 can be increased with the addition of one or more small dielectric pads 32, whereby the top substrate 24 must undergo additional deformation before the conductive layer thereon is able contact both conductive paths 29a,b. The protrusions 19 preferably exhibit sufficient flexibility to conform to the associated deformation pattern needed for switch closure.

The membrane switch pad 12 can be made relatively small, e.g., under four square inches, which is advantageous for ensuring that each of the membrane switch elements 14 is exposed to approximately the same force level for a given seat loading. One of ordinary skill in the art will understand that the number of membrane switch elements 14 incorporated in the membrane seat weight sensor can be increased or decreased from that shown herein as necessary to either increase or decrease the load resolution of the sensor.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

I claim:

1. A sensor for measuring a compressive load, comprising:
   a. a first plate having first and second sides;
   b. a plurality of protrusions on said second side of said first plate;
   c. a second plate having first and second sides, whereby the compressive load is applied across respective said first sides of said first and second plates; and
   d. a plurality of membrane switch elements interposed between respective said second sides of said first and second plates, each said membrane switch element of said plurality of membrane switch elements having an associated activation force threshold whereby when the compressive load exceeds said associated activation force threshold said membrane switch element is closed, at least two associated activation force thresholds are substantially different from one another, each said membrane switch element comprising:

1) a flexible and elastic first substrate having first and second sides, wherein said first side of said first substrate is operatively coupled to one of said protrusions and said second side of said first substrate is conductive over at least a portion of the surface of said second side so as to constitute a first conductor;

2) a second substrate having first and second sides, wherein said first side of said second substrate is operatively coupled to said second side of said second plate and said second side of said second substrate is conductive over at least a portion of the surface of said second side so as to constitute a second conductor; and 3) a spacer having an aperture, wherein said protrusion operatively coupled to said first substrate is operative within said aperture and said spacer is interposed between respective said second sides of said first and second substrates, whereby when the magnitude of the compressive load exceeds said associated activation force threshold of said membrane switch element, said protrusion operatively coupled to said first substrate causes said first substrate to deflect such that at least a portion of said first conductor also contacts at least a portion of said second conductor thereby closing said membrane switch element.

2. A sensor for measuring a compressive load as recited in claim 1, wherein said first and second substrates for all of said membrane switch elements are each respectively continuous.

3. A sensor for measuring a compressive load as recited in claim 1, wherein each of said membrane switch elements is in series combination with an associated resistor at a point of connection whereby said series combination has first and second terminals distinct from said point of connection and said first and second terminals for each said series combination for all of said membrane switch elements are interconnected in a parallel circuit having common first and second terminals, whereby the output signal from the sensor is across said common first and second terminals.

4. A sensor for measuring a compressive load as recited in claim 1, wherein said second side of said second substrate is conductive over a portion of the surface so as to constitute a third conductor which is proximate to and distinct from said second conductor, whereby when the magnitude of the compressive load exceeds said associated activation force threshold of said membrane switch element, said protrusion operatively coupled to said first substrate causes said first substrate to deflect such that at least a portion of said first conductor also contacts at least a portion of said third conductor thereby closing said membrane switch element.

5. A sensor for measuring a compressive load as recited in claim 4, wherein said first and second substrates for all of said membrane switch elements are each respectively continuous.

6. A sensor for measuring a compressive load as recited in claim 4, wherein each of said membrane switch elements is in series combination with an associated resistor at a point of connection whereby said series combination has first and second terminals distinct from said point of connection and said first and second terminals for each said series combination are interconnected in a parallel circuit having common first and second terminals, whereby the output signal from the sensor is across said common first and second terminals.

7. A sensor for measuring a compressive load as recited in claim 4, further comprising one or more dielectric pads attached to said second side of said second substrate proximate said second and third conductors.

8. A sensor for measuring a compressive load as recited in claim 5, further comprising one or more dielectric pads attached to said second side of said second substrate proximate said second and third conductors.

9. A sensor for measuring a compressive load as recited in claim 6, further comprising one or more dielectric pads attached to said second side of said second substrate proximate said second and third conductors.

10. A sensor for measuring a compressive load as recited in claim 1, wherein said plurality of membrane switch elements comprises first and second membrane switch elements and the size of said aperture of said spacer of said first membrane switch element differs from the size of said aperture of said spacer of said second membrane switch element so that the associated activation force thresholds of said first and second membrane switch elements are substantially different from one another.

11. A sensor for measuring the weight of an occupant in a vehicle seat, comprising:

a. a membrane weight sensor element locatable under a seat cushion of the vehicle seat, comprising:

1) a first plate having first and second sides;
2) a plurality of protrusions on said second side of said first plate;
3) a second plate having first and second sides, whereby the weight of the occupant causes a compressive load to be applied across respective said first sides of said first and second plates; and
4) a plurality of membrane switch elements interposed between respective said second sides of said first and second plates, each said membrane switch element of said plurality of membrane switch elements having an associated activation force threshold whereby when the compressive load exceeds said associated activation force threshold said membrane switch element is closed, at least two associated activation force thresholds are substantially different from one another each said membrane switch element comprising:

a) a flexible and elastic first substrate having first and second sides, wherein said first side of said first substrate is operatively coupled to one of said protrusions and said second side of said first substrate is conductive over at least a portion of the surface of said second side so as to constitute a first conductor;

b) a second substrate having first and second sides, wherein said first side of said second substrate is operatively coupled to said second side of said second plate and said second side of said second substrate is conductive over at least a portion of the surface of said second side so as to constitute a second conductor; and c) a spacer having an aperture, wherein said protrusion operatively coupled to said first substrate is operative within said aperture and said spacer is interposed between respective said second sides of said first and second substrates, whereby when the magnitude of the compressive load exceeds said associated activation force threshold of said membrane switch element, said protrusion operatively coupled to said first substrate causes said first substrate to deflect such that at least a portion of said first conductor also contacts at least a portion of said second conductor thereby closing said membrane switch element; and b. a signal processor for determining the weight of the occupant from the closure state of said membrane switch elements.

12. A sensor for measuring the weight of an occupant in a vehicle seat as recited in claim 11, wherein said first and second substrates for all of said membrane switch elements are each respectively continuous.

13. A sensor for measuring the weight of an occupant in a vehicle seat as recited in claim 11, wherein each of said membrane switch elements is in series combination with an associated resistor at a point of connection whereby said series combination has first and second terminals distinct from said point of connection and said first and second terminals for each said series combination for all of said membrane switch elements are interconnected in a parallel circuit having common first and second terminals, whereby the output signal from the sensor is across said common first and second terminals.

14. A sensor for measuring the weight of an occupant in a vehicle seat as recited in claim 11, wherein said second side of said second substrate is conductive over a portion of the surface so as to constitute a third conductor which is proximate to and distinct from said second conductor, whereby when the magnitude of the compressive load exceeds said associated activation force threshold of said membrane switch element, said protrusion operatively coupling said first substrate causes said first substrate to deflect such that at least a portion of said first conductor also contacts at least a portion of said third conductor thereby closing said membrane switch element.

15. A sensor for measuring the weight of an occupant in a vehicle seat as recited in claim 14, wherein said first and second substrates for all of said membrane switch elements are each respectively continuous.

16. A sensor for measuring the weight of an occupant in a vehicle seat as recited in claim 14, wherein each of said membrane switch elements is in series combination with an associated resistor at a point of connection whereby said series combination has first and second terminals distinct from said point of connection and said first and second terminals for each said series combination are interconnected in a parallel circuit having common first and second terminals, whereby the output signal from the sensor is across said common first and second terminals.

17. A sensor for measuring the weight of an occupant in a vehicle seat as recited in claim 14, further comprising one or more dielectric pads attached to said second side of said second substrate proximate said second and third conductors.

18. A sensor for measuring the weight of an occupant in a vehicle seat as recited in claim 15, further comprising one or more dielectric pads attached to said second side of said second substrate proximate said second and third conductors.

19. A sensor for measuring the weight of an occupant in a vehicle seat as recited in claim 16, further comprising one or more dielectric pads attached to said second side of said second substrate proximate said second and third conductors.

* * * * *